United States Patent

Tsuchiya

(10) Patent No.: US 11,600,152 B2
(45) Date of Patent: Mar. 7, 2023

(54) READING DEVICE

(71) Applicant: TOSHIBA TEC KABUSHIKI KAISHA, Tokyo (JP)

(72) Inventor: Osamu Tsuchiya, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/546,222

(22) Filed: Dec. 9, 2021

(65) Prior Publication Data
US 2022/0292933 A1    Sep. 15, 2022

(30) Foreign Application Priority Data

Mar. 12, 2021   (JP) .............................. JP2021-040234

(51) Int. Cl.
G07G 1/00     (2006.01)
G06Q 20/18    (2012.01)
G06Q 20/20    (2012.01)

(52) U.S. Cl.
CPC ........... *G07G 1/0063* (2013.01); *G06Q 20/18* (2013.01); *G06Q 20/208* (2013.01); *G07G 1/0054* (2013.01)

(58) Field of Classification Search
CPC .... G07G 1/0063; G07G 1/0054; G06Q 20/18; G06Q 20/208
See application file for complete search history.

(56) References Cited

U.S. PATENT DOCUMENTS 10,510,218 B2 * 12/2019 Kinno ..................... A47F 9/047
2010/0059589 A1 *  3/2010 Goncalves ........... G07G 1/0054
                                                           382/218
(Continued)

FOREIGN PATENT DOCUMENTS

JP     2008152710 A  *  7/2008
WO  WO-2019163094 A1 *  8/2019 ............... G06F 3/16

OTHER PUBLICATIONS

Flores, F. K., et al. "TRICEP: Technologies of RFID and image recognition in a checkout enhancement platform." Theory and Practice of Computation. CRC Press, 2019. 82-91. (Year: 2019).*

(Continued)

*Primary Examiner* — Nathan A Mitchell
(74) *Attorney, Agent, or Firm* — Foley & Lardner LLP

(57) ABSTRACT

According to at least one embodiment, a reading device includes a first device and a second device. The first device includes an imaging unit, a first recognition unit configured to recognize a commodity from a captured image of the imaging unit, and a voice output unit configured to emit a voice if the first recognition unit recognizes the commodity. The second device is separate from the first device, and includes a second recognition unit configured to recognize a commodity from the captured image by a method different from that of the first recognition unit and a second voice generation unit configured to output voice data for sounding the voice output unit if the second recognition unit recognizes the commodity. The first device includes a first voice generation unit configured to output voice data for sounding the voice output unit if the first recognition unit recognizes the commodity, an input unit configured to take in voice data output by the second voice generation unit into the first device, and a voice mixer configured to input the voice data (Continued)

taken in by the input unit and the voice data output by the first voice generation unit to the voice output unit.

20 Claims, 5 Drawing Sheets

(56) References Cited

U.S. PATENT DOCUMENTS

| | | | |
|---|---|---|---|
| 2014/0153786 A1* | 6/2014 | Takeno | G06V 10/987 |
| | | | 382/110 |
| 2016/0132855 A1 | 5/2016 | Yamamoto | |
| 2017/0076270 A1* | 3/2017 | Iizaka | G06V 10/40 |
| 2020/0202681 A1* | 6/2020 | Crooks | G07G 1/0009 |
| 2021/0097355 A1* | 4/2021 | Shiraishi | G07G 1/0036 |
| 2021/0117948 A1* | 4/2021 | Voss | G06N 3/08 |
| 2021/0158000 A1* | 5/2021 | Fjellstad | G06K 7/1413 |
| 2021/0295078 A1* | 9/2021 | Barkan | G06V 10/443 |
| 2021/0295299 A1* | 9/2021 | Suzuki | G07G 1/0045 |
| 2021/0397800 A1* | 12/2021 | Kim | G06K 7/10861 |
| 2022/0067568 A1* | 3/2022 | Hemmatiyan | G06F 16/56 |
| 2022/0207274 A1* | 6/2022 | Folkens | G06Q 30/02 |

OTHER PUBLICATIONS

Wei, Yuchen, et al. "Deep learning for retail product recognition: Challenges and techniques." Computational intelligence and neuroscience 2020 (2020). (Year: 2020).*

* cited by examiner

READING DEVICE

CROSS-REFERENCE TO RELATED APPLICATION

This application is based upon and claims the benefit of priority from Japanese Patent Application No. 2021-040234, filed on Mar. 12, 2021, the entire contents of which are incorporated herein by reference.

FIELD

Embodiments described herein relate generally to a reading device.

BACKGROUND

In the related art, in a sales data registration process for registering information on a commodity to be sold, a plurality of methods may be used together as a method for identifying the commodity. The commodity identification methods used together are, for example, commodity identification by recognition of a code symbol such as a barcode and commodity identification by object recognition. The commodity identification by code symbol recognition is performed by decoding the code symbol included in an image (captured image) output by an imaging unit. The commodity identification by object recognition is performed by calculating feature data of an appearance of the commodity based on the captured image and inquiring the calculated feature data of a database.

If a plurality of methods are used together as described above, in the related art, due to circumstances such as distributing processing load, respective methods may be shared by separate devices such as a vertical scanner and a POS terminal. In this case, each device is provided with a speaker for emitting a voice (recognition sound) for notifying an operator that the commodity is recognized. Since the speaker needs to be provided at a position where the operator can hear the emitted voice, the speaker is a component that has many restrictions when designing a casing and has a heavy design burden. If there are a plurality of such parts, the design burden increases, which is not preferable.

If the code symbol can be decoded and if the feature data is obtained by object recognition, since separate devices emit recognition sounds, the operator sometimes hears a notification sound from another place even though all the commodities are held over an imaging unit in the same way, which causes discomfort and confusion.

Although the POS terminal and the vertical scanner are described as an example, there is a common problem not only in the case of such a configuration but also in the case where a configuration in which separate devices (not an integrated device) are in charge of the plurality of methods for identifying the commodity is adopted.

DETAILED DESCRIPTION

An object to be solved by exemplary embodiments is to provide a reading device that can emit a recognition sound at the same place regardless of the commodity identification method in a configuration in which separate devices perform a plurality of methods for identifying the commodity.

In general, according to at least one embodiment, there is provided a reading device including a first device and a second device. The first device includes an imaging unit, a first recognition unit configured to recognize a commodity from a captured image of the imaging unit, and a voice output unit configured to emit a voice if the first recognition unit recognizes the commodity. The second device is separate from the first device, and includes a second recognition unit configured to recognize a commodity from the captured image by a method different from that of the first recognition unit. The second device includes a second voice generation unit configured to output voice data for sounding the voice output unit if the second recognition unit recognizes the commodity. The first device includes a first voice generation unit configured to output voice data for sounding the voice output unit if the first recognition unit recognizes the commodity, an input unit configured to take in voice data output by the second voice generation unit into the first device, and a voice mixer configured to input the voice data taken in by the input unit and the voice data output by the first voice generation unit to the voice output unit.

First Embodiment

Figure 1:
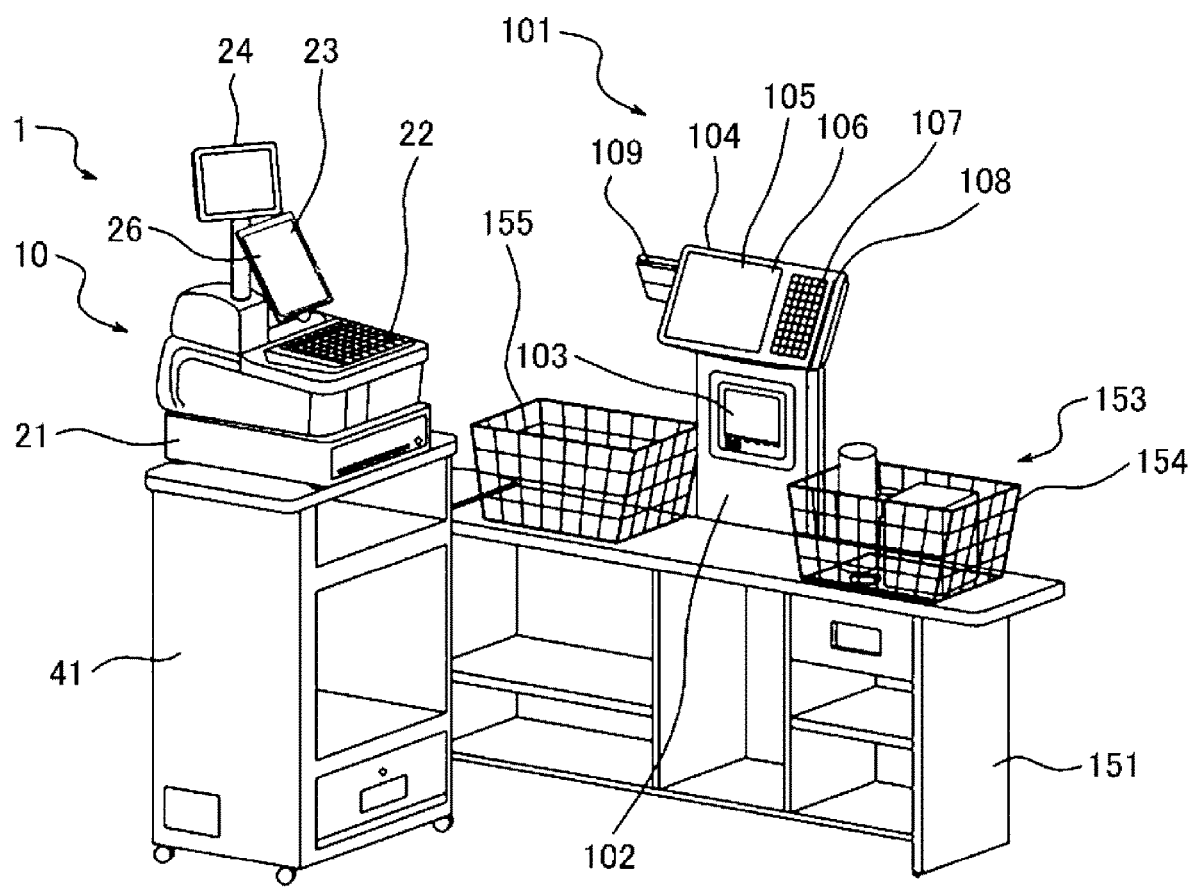
FIG. 1 is a perspective view illustrating an example of a checkout device according to a first embodiment.

At least one embodiment of a reading device will be described in detail below with reference to the accompanying drawings. FIG. 1 is a perspective view illustrating an example of a checkout device 1 according to at least one embodiment. The checkout device 1 is an example of the reading device, and includes a point of sales (POS) terminal 10 and a vertical scanner 101 connected to the POS terminal 10. The POS terminal is an example of a second device, and is used for a registration process of sales data in, for example, a supermarket or a convenience store. The vertical scanner 101 is an example of a first device, and is used by connecting to the POS terminal 10.

The vertical scanner 101 is a device that receives input of information (commodity information) about a commodity, and recognizes the commodity by reading information from an image (captured image) obtained by capturing, or receives commodity information manually input by an operator. The POS terminal 10 performs registration and checkout of commodities related to one transaction. The POS terminal 10 recognizes a commodity by performing generic object recognition (object recognition) based on a captured image input from the vertical scanner 101. In the embodiment, as an example, although a case where an article (target article) to be subjected to generic object recognition is a commodity will be described, the target article may be an article other than the commodity.

The POS terminal 10 is placed on the upper surface of a drawer 21 on a checkout table 41. An opening operation of the drawer 21 is controlled by the POS terminal 10. The POS terminal 10 includes a keyboard 22, a first display 23, a second display 24, and a touch panel 26. The keyboard 22 is provided on the upper surface of the POS terminal 10 and is operated by the operator (salesclerk). The first display 23 is, for example, a liquid crystal display, which is provided on the back side of the keyboard 22 when viewed from the operator who operates the keyboard 22, and mainly displays various information directed to the operator. The touch panel 26 is provided so as to be superimposed on a display surface of the first display 23, and receives various operations according to display contents of the first display 23. The second display 24 is rotatably and arranged on the back side of the first display 23. The second display 24 is directed to the front side in FIG. 1, but is directed to the back side in FIG. 1 by rotation, and is mainly used for displaying various information directed to a customer.

A counter stand 151 has a horizontally long table shape, and is disposed so as to form an L shape with the checkout stand 41 on which the POS terminal 10 is placed. A shopping basket 153 for accommodating the commodity is placed on the counter stand 151. The shopping basket 153 is not limited to a so-called basket shape, and may be a tray or the like. Alternatively, the shopping basket 153 may be in the shape of a box, a bag, or the like. The shopping basket 153 may include a first shopping basket 154 brought in by the customer and a second shopping basket 155 placed at a position across the vertical scanner 101 from the first shopping basket 154.

The vertical scanner 101 is installed at the center of the counter stand 151 and on the back side when viewed from the operator's standing position. The vertical scanner 101 is connected to the POS terminal 10 so as to be able to transmit and receive data. The vertical scanner 101 includes a thin rectangular housing 102 and a reading window 103 provided in front of the housing 102, and incorporates an imaging unit 113 (see FIG. 2) inside the housing 102 and on the back side of the reading window 103. An operation display unit 104 is attached to the upper part of the housing 102.

The operation display unit 104 includes a first display 106 on which a touch panel 105 is stacked on the surface. The vertical scanner 101 includes a keyboard 107 disposed to the right of the first display 106. The vertical scanner 101 includes a card reading groove 108 of a card reading device 111 (see FIG. 2) disposed to the right of the keyboard 107. The vertical scanner 101 includes a second display 109 that provides information to the customer and is disposed on the far left side of the back surface of the operation display unit 104 when viewed from the operator's standing position.

The first display 106 is, for example, a liquid crystal display, and mainly displays various information directed to the operator. The touch panel 105 receives various operations according to the display contents of the first display 106. The second display 109 is, for example, a liquid crystal display, and is mainly used for displaying various information directed to the customer.

In the first shopping basket 154, the commodities related to one transaction are accommodated. The operator who operates the vertical scanner 101 moves the commodities in the first shopping basket 154 to the second shopping basket 155. In this moving process, the operator holds the commodity over the reading window 103 of the vertical scanner 101. At this time, the imaging unit 113 (see FIG. 2) disposed in the reading window 103 captures the commodity.

Figure 2:
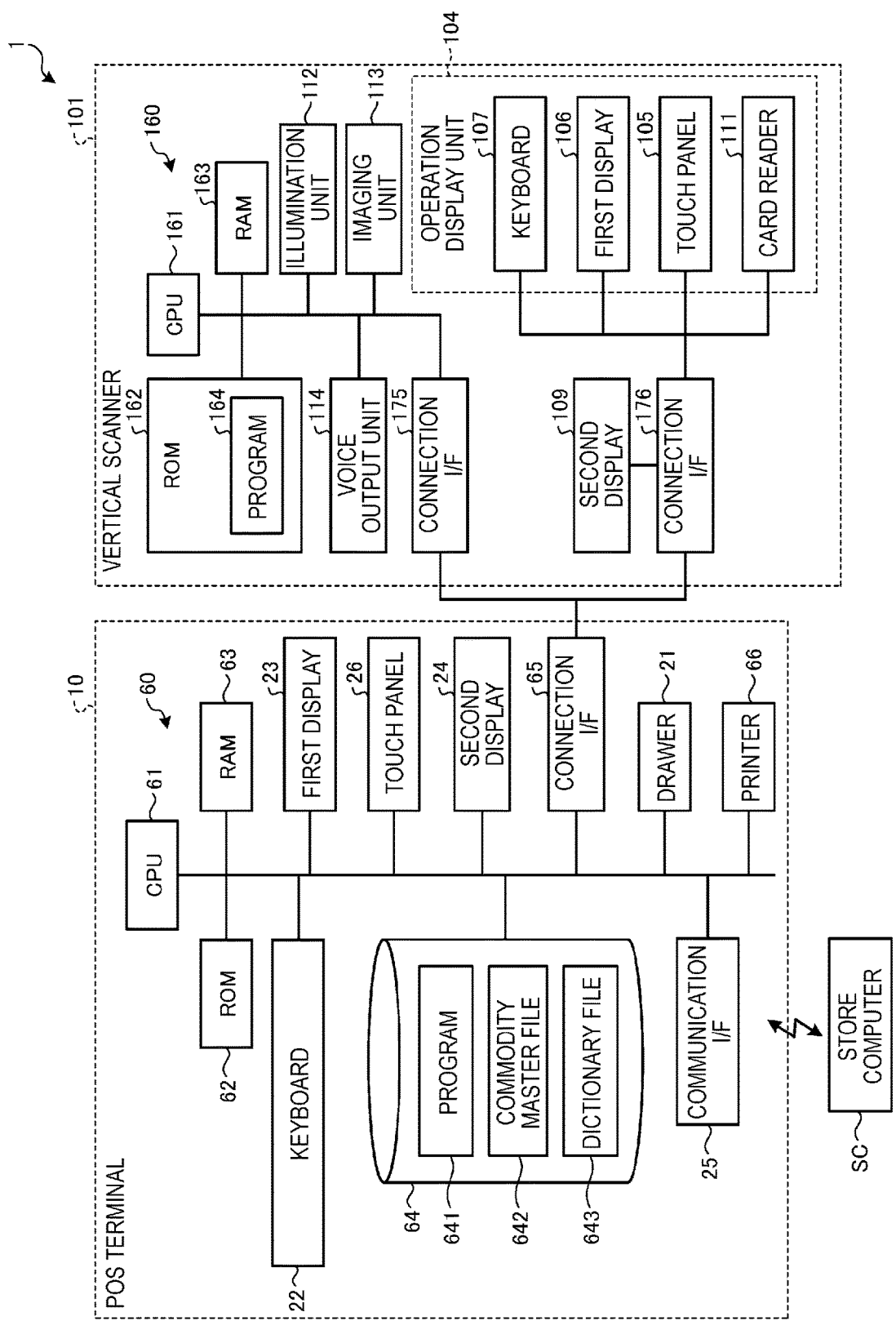
FIG. 2 is a block diagram illustrating a basic configuration of the checkout device.

FIG. 2 is a block diagram illustrating a basic configuration of the checkout device 1 according to at least one embodiment. The checkout device 1 includes the POS terminal 10 and the vertical scanner 101 connected to the POS terminal 10.

The POS terminal 10 includes a microcomputer (control unit 60) that executes information processing. The control unit 60 is configured by connecting a central processing unit (CPU) 61 that executes various computation processes and controls each unit, a read only memory (ROM) 62, and a random access memory (RAM) 63 by a bus.

The drawer 21, the keyboard 22, the first display 23, the touch panel 26, and the second display 24 are connected to the CPU 61 of the POS terminal 10 via various input and output circuits.

A hard disk drive (HDD) 64 is connected to the CPU 61 of the POS terminal 10. The HDD 64 stores a program 641 and various files. The program 641 stored in the HDD 64 is entirely or partially executed by the CPU 61 if the POS terminal 10 is started. An example of the program 641 stored in the HDD 64 is the program 641 for processing commodity sales data. Examples of the files stored in the HDD 64 are a commodity master file 642 and a dictionary file 643. The commodity master file 642 and the dictionary file 643 are distributed from a store computer SC at a predetermined timing such as before a store opens and are stored in the HDD 64. The HDD 64 also stores a sales master file and the like. Any storage device can be used as the HDD 64, and the HDD 64 may be a storage device configured with another storage medium such as a solid state drive (SSD).

The commodity master file 642 is a file for storing information used for sales registration for each commodity displayed and sold in a store, and stores commodity information such as a commodity name and a price in correlation with a commodity code that makes it possible to identify the commodity, for example. The dictionary file 643 stores reference values of feature data of a plurality of commodities in correlation with the commodity code.

A communication interface (I/F) 25 for executing data communication with the store computer SC is connected to the CPU 61 of the POS terminal 10 via an input and output circuit. The store computer SC is installed in a backroom of the store or the like. The commodity master file 642 distributed to the POS terminal 10 is stored in the HDD of the store computer SC.

Furthermore, a connection I/F 65 that enables data transmission and reception with the vertical scanner 101 is connected to the CPU 61 of the POS terminal 10. The vertical scanner 101 is connected to the connection I/F 65. A printer 66 for printing on a receipt or the like is connected to the CPU 61 of the POS terminal 10. The printer 66 prints transaction details of one transaction on the receipt under the control of the CPU 61.

The vertical scanner 101 includes a microcomputer (control unit 160) in which a CPU 161, a ROM 162, and a RAM 163 are connected by a bus. The ROM 162 stores a program 164 according to at least one embodiment. In the CPU 161, an illumination unit 112, the imaging unit 113, a voice output unit 114, and the like are connected to the CPU 161 via various buses and I/Fs, and the operation of each of these units are controlled. The control unit 160 is connected to the POS terminal 10 via a connection I/F 175.

The voice output unit 114 is a voice circuit, a speaker, or the like for generating a voice such as a preset warning sound. The illumination unit 112 is configured by, for example, arranging a plurality of light emitting diodes (LEDs) in line. The illumination unit 112 emits light having pulses in response to a light emission control signal input from the control unit 160 to illuminate an imaging region of the imaging unit 113. The illumination unit 112 may be configured with other light emitting elements.

The imaging unit 113 is an imaging device including an image sensor (also referred to as an imaging element) such as a charge coupled device (CCD) or complementary metal-oxide semiconductor (CMOS), and an optical element such as a lens. The imaging unit 113 sequentially reads frame images into the RAM 163 at a frame rate (the number of frames read per second) based on an imaging control signal.

The imaging unit 113 sequentially outputs image data (that is, captured image) obtained by capturing to the control unit 160 of the vertical scanner 101 and the control unit 60 of the POS terminal 10.

The operation display unit 104 for the salesclerk and the second display 109 for the customer are connected to the CPU 161 via the connection I/F 175 and a connection I/F 176. The operation display unit 104 and the second display 109 are connected to the CPU 61 of the POS terminal 10 via the connection I/F 176 and the connection I/F 65 of the POS terminal 10.

Figure 3:
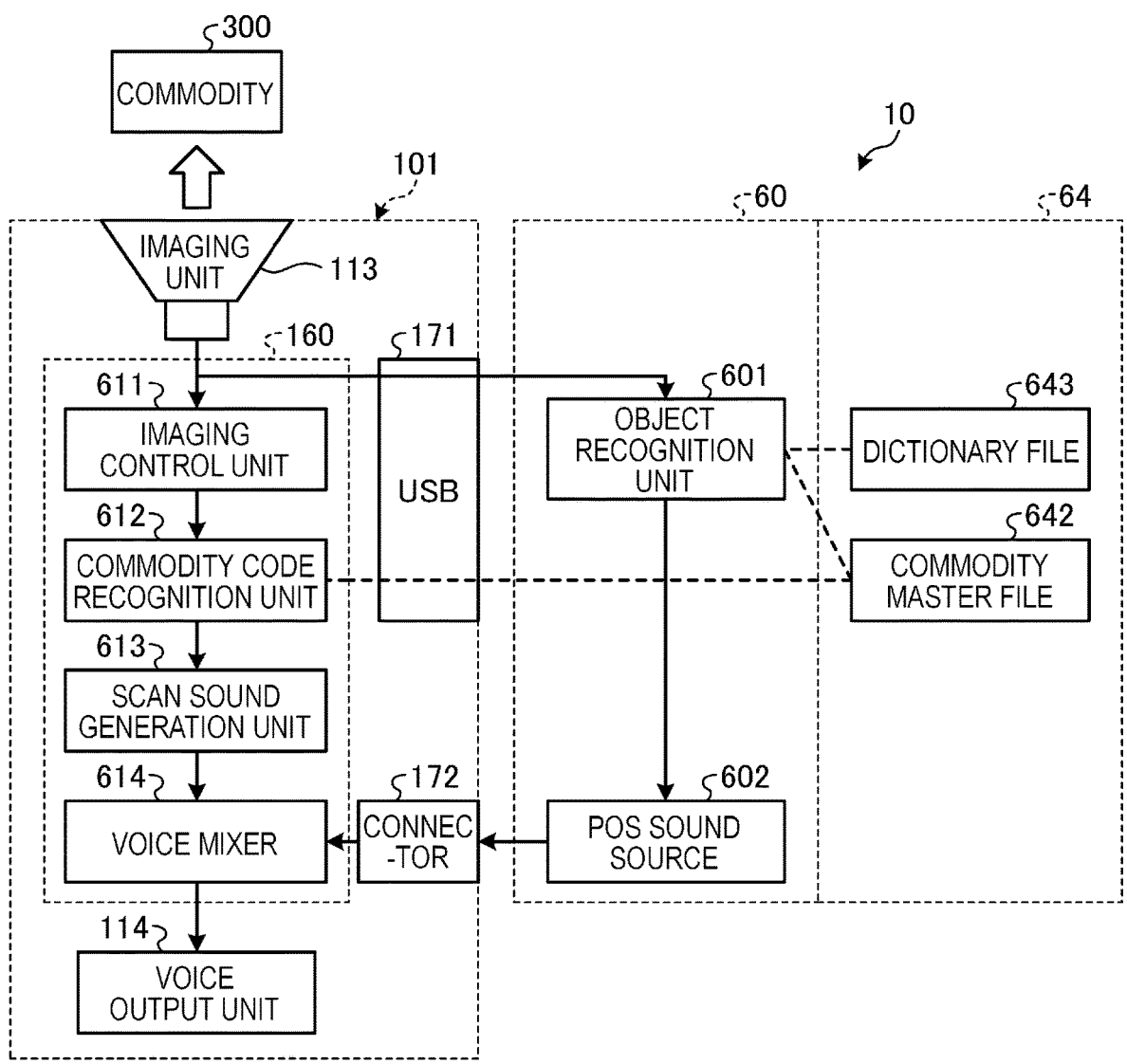
FIG. 3 is a diagram illustrating a characteristic configuration and data flow of a vertical scanner and a POS terminal.

FIG. 3 is a diagram illustrating a characteristic configuration and data flow of the vertical scanner 101 and the POS terminal 10. The vertical scanner 101 further includes a USB terminal 171 and an analog voice connector 172 (an example of an input unit). The control unit 160 of the vertical scanner 101 functions as an imaging control unit 611, a commodity code recognition unit 612 (an example of the first recognition unit), sound generation unit 613 (an example of the first voice generation unit), and a voice mixer 614.

The imaging control unit 611 controls the imaging unit 113, and outputs an image (captured image) captured by the imaging unit 113 to the commodity code recognition unit 612. The commodity code recognition unit 612 decodes a code symbol such as a bar code or a two-dimensional code included in the captured image to obtain the commodity code.

If the commodity code recognition unit 612 decodes the code symbol, the scan sound generation unit 613 outputs voice data for the voice output unit 114 to emit a recognition sound to the voice mixer 614 in order to notify the operator that the commodity is recognized. Here, the recognition sound is a voice for notifying the operator that the commodity is recognized. The voice mixer 614 outputs the input voice data to the voice output unit 114. The voice output unit 114 emits the voice by receiving voice data.

The commodity code recognition unit 612 refers to the commodity master file 642 and acquires information (commodity information) of the commodity corresponding to the commodity code obtained from the code symbol.

The control unit 60 of the POS terminal 10 functions as an object recognition unit 601 (an example of a second recognition unit) and includes a POS sound source 602 (an example of a second voice generation unit).

The object recognition unit 601 performs a generic object recognition process (so-called object recognition process). In an example of the generic object recognition process, the object recognition unit 601 first extracts feature data indicating characteristics of an appearance of a commodity 300 from the captured image of the commodity 300 captured by the imaging unit 113. In the extraction of the feature data, the object recognition unit 601 first acquires the captured image of the imaging unit 113 via the USB terminal 171 and detects the image region representing the commodity 300 included in the captured image.

In the detection of the image region, the object recognition unit 601 extracts a contour line or the like from an image obtained by binarizing the captured image. Alternatively, the object recognition unit 601 detects the commodity 300 based on a difference between a contour line extracted from a background image prepared in advance and the contour line extracted from the captured image. Here, the background image is an image, which is captured by the imaging unit 113, of the background that does not include the commodity 300. As a result, the object recognition unit 601 detects the image region in which the commodity 300 is represented by extracting the contour line that is not present in the contour line of the background image from the captured image.

If the image region is detected, the object recognition unit 601 extracts the feature data of the commodity 300 from the image region of the commodity 300 detected from the captured image. The feature data is information obtained by parameterizing characteristics of an appearance such as a shape, surface color, pattern, and unevenness of the commodity 300.

If the feature data is extracted from the captured commodity, the object recognition unit 601 collates the extracted feature data with the reference value of feature data stored in the dictionary file 643, and calculates the similarity between each reference value and the feature data of the commodity 300. Then, the object recognition unit 601 finishes the generic object recognition process, for example, by regarding the commodity code correlated with the reference value that has the highest similarity to the feature data of commodity 300 as the commodity code of the commodity 300.

If the object recognition unit 601 outputs a signal indicating that the commodity is recognized by the generic object recognition process, the POS sound source 602 outputs analog voice data for the recognition sound. The analog voice data output by the POS sound source 602 is input to the voice mixer 614 via the analog voice connector 172. The voice mixer 614 outputs the input voice data to the voice output unit 114. The voice output unit 114 emits voice by receiving voice data.

The object recognition unit 601 refers to the commodity master file 642 to acquire information (commodity information) of the commodity corresponding to the commodity code obtained by the generic object recognition process.

Thus, according to at least one embodiment, in a configuration in which separate devices perform a plurality of methods for identifying the commodity, the reading device capable of emitting a recognition sound at the same place regardless of the commodity identification methods can be provided. That is, in both the case where the commodity is recognized by the recognition of the code symbol and the case where the commodity is recognized by the generic object recognition process, the recognition sound can be emitted by the voice output unit 114 in the vertical scanner 101.

As a result, one voice output unit 114 has the functions of two speakers in the related art, and thus the design burden on the casing can be reduced according to at least one embodiment.

Consequently, it is possible to obtain the same result that the operator can hear the recognition sound from the same place (voice output unit 114) for the same operation of holding the commodity over the reading window 103 regardless of which commodity identification method is used. Therefore, according to at least one embodiment, the cause of discomfort and confusion in the related art can be eliminated.

In at least one embodiment, an example in which the reading device is configured by the POS terminal 10 and the vertical scanner 101 is described, but is not limited to the reading device having such a configuration when implementing the embodiment. For example, the reading device may be a self-service checkout device.

In at least one embodiment, an example in which the POS terminal 10 includes the object recognition unit 601 and the POS sound source 602 is described, but is not limited thereto when implementing the at least one embodiment. For example, an information processing device having a general computer configuration such as a personal computer may include the object recognition unit 601 and the POS sound source 602.

Furthermore, in at least one embodiment, an example in which the vertical scanner 101 performs capturing and code symbol recognition processing is described, but is not limited thereto when implementing the at least one embodiment. For example, a handy type scanner, a stationary type scanner, or a mobile terminal (smartphone or tablet terminal) including a camera may perform capturing and code symbol recognition processing.

Second Embodiment

Figure 4:
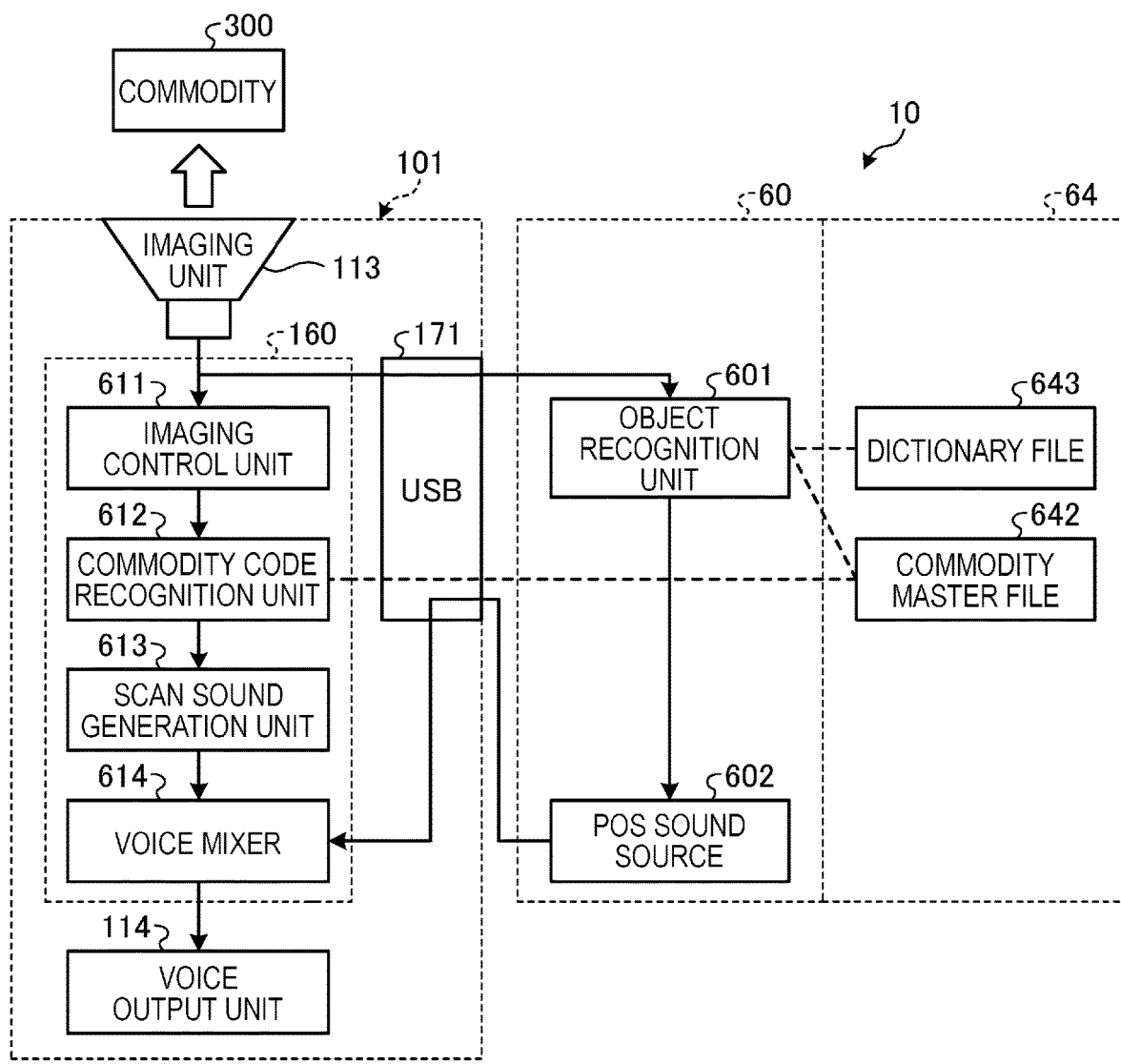
FIG. 4 is a diagram illustrating a characteristic configuration and data flow of a vertical scanner and a POS terminal according to a second embodiment.

Next, a second embodiment of the reading device will be described. Since the embodiment is a modification example of the first embodiment, the same configurations illustrated in the first embodiment are denoted by the same reference numerals, and duplicate description thereof will be omitted. FIG. 4 is a diagram illustrating a characteristic configuration and data flow of the vertical scanner 101 and the POS terminal 10 according to the second embodiment.

In at least one embodiment, the POS sound source 602 outputs voice data, which is digital data, as voice data for the recognition sound. The voice data output by the POS sound source 602 is input to the voice mixer 614 via the USB terminal 171.

According to such an embodiment, the same effect as that of the first embodiment can be obtained.

Third Embodiment

Figure 5:
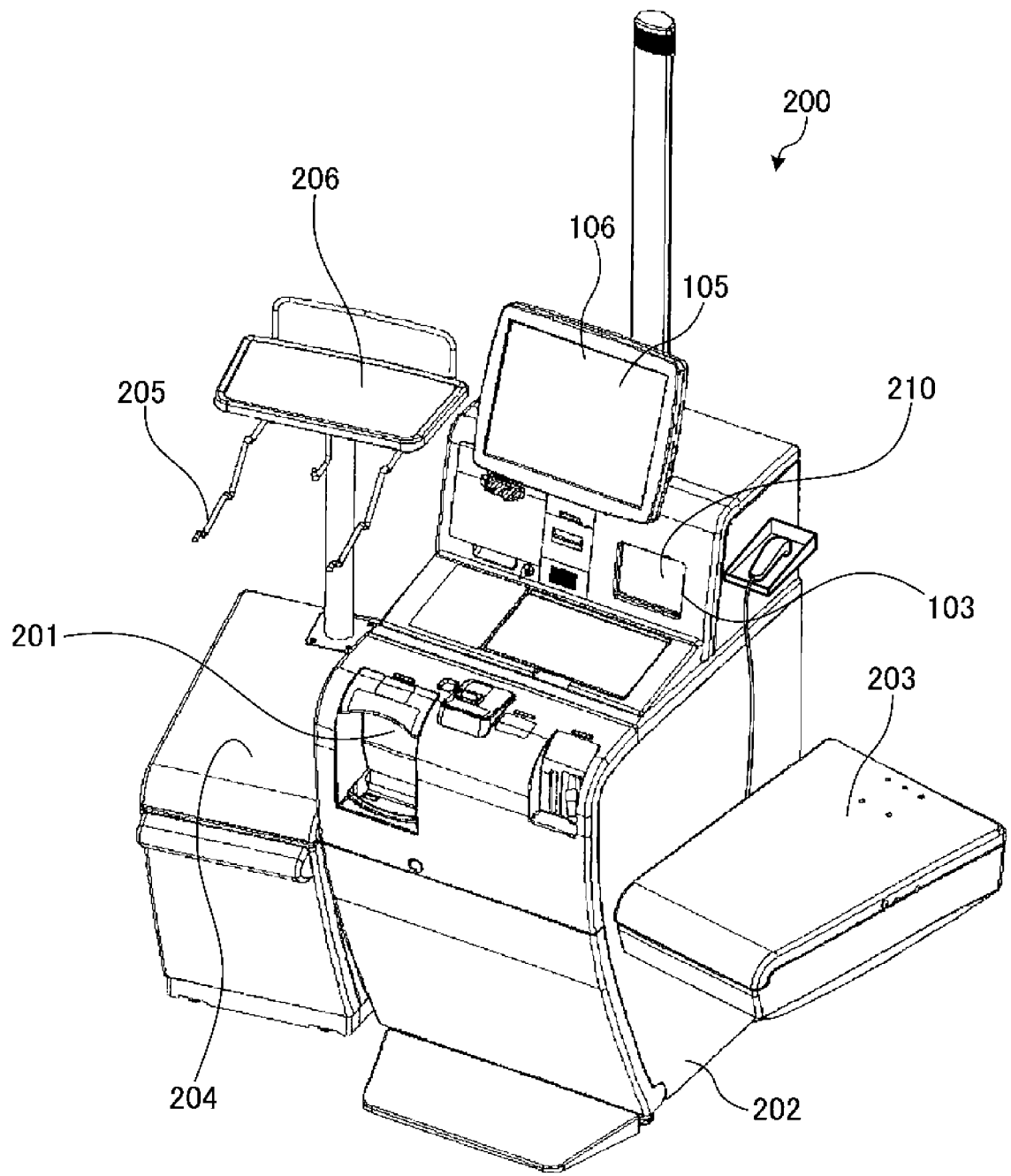
FIG. 5 is a perspective view illustrating an example of a configuration of a self-service checkout device according to a third embodiment.

Next, a third embodiment of the reading device will be described. Since the embodiment is a modification example of the first embodiment, the same configurations illustrated in the first embodiment are denoted by the same reference numerals, and duplicate description thereof will be omitted. FIG. 5 is a perspective view illustrating an example of a configuration of a self-service checkout device 200 according to the embodiment.

A main body 202 of the self-service checkout device 200 includes the first display 106 on which the touch panel 105 is arranged on the surface, and a commodity reading unit 210 that reads a commodity image in order to recognize (identify) a commodity type or the like. The commodity reading unit 210 reads the commodity image by the imaging unit 113 by the customer holding the code symbol attached to the commodity over the reading window 103 of the commodity reading unit 210. The main body 202 of the self-service checkout device 200 includes a change-giving device 201 for depositing bills for checkout and receiving bills for change.

Furthermore, the self-service checkout device 200 is provided with a commodity placement stand 203 on the right side of the main body 202 for placing the commodities for which checkout is not completed in a basket and is provided with a commodity placement stand 204 for placing commodities for which checkout is completed on the left side of the main body 202. The commodity placement stand 204 includes a bag hook 205 that hangs a bag for storing the commodities for which checkout is completed, and a temporary placement stand 206 for temporarily placing the commodities for which checkout is completed before placing the commodities into the bag. The commodity placement stands 203 and 204 are provided with measuring instruments 207 and 208, respectively, and have a function of confirming that weights of the commodities are the same before and after the checkout.

The self-service checkout device 200 is an example of the reading device that incorporates the first device and the second device and performs a registration process for registering information of the commodity recognized by the first recognition unit (commodity code recognition unit 612) or the second recognition unit (object recognition unit 601) as sales data, and a settlement process of sales data. The first device has a configuration having a function corresponding to the vertical scanner 101 in the previous embodiments and the second device has a configuration having a function corresponding to the POS terminal 10 in the previous embodiments.

According to such a self-service checkout device 200, the same effect as that of the first embodiment can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A reading device comprising:
    a first device, including:
        an imager;
        a first recognizer configured to recognize a commodity from a captured image of the imager; and
        a voice output configured to, when the first recognizer recognizes the commodity, emit a voice; and
    a second device separate from the first device, the second device including a second recognizer configured to recognize a commodity from the captured image by a method different from that of the first recognizer, wherein
    the second device further includes a second voice generator configured to output voice data for sounding the voice output when the second recognizer recognizes the commodity, and
    the first device further includes:
        a first voice generator configured to output voice data for sounding the voice output when the first recognizer recognizes the commodity,
        an input configured to take in voice data output by the second voice generator into the first device, and
        a voice mixer configured to input voice data taken in by the input and the voice data output by the first voice generator to the voice output.
2. The reading device according to claim 1, wherein
    the first recognizer is a code recognizer that decodes a code symbol included in an image output by the imager to obtain information, and
    the second recognizer is an object recognizer that obtains feature data of an object in an image from the image output by the imager.

3. The reading device according to claim 1, wherein
the second voice generator is configured to output voice data which is analog data, and
the input is a connector for analog voice data input.

4. The reading device according to claim 1, wherein
the second voice generator is configured to output voice data which is digital data, and
the input is a USB terminal.

5. The reading device according to claim 1, wherein
a self-service checkout device incorporates the first device and the second device, and the self-service checkout device is configured to perform a registration process for registering information of a commodity recognized by the first recognizer or the second recognizer as sales data and a settlement process of the sales data.

6. The reading device according to claim 1, wherein the first device includes a scanner.

7. The reading device according to claim 1, wherein the second device includes a point of sale terminal.

8. The reading device according to claim 1, wherein the reading device includes a check out device.

9. The reading device according to claim 1, wherein the voice output includes at least one of a voice circuit or a speaker.

10. The reading device according to claim 1, wherein the imager includes an image sensor.

11. The reading device according to claim 10, wherein the imager includes an optical element arranged to focus light onto the image sensor.

12. A reading method, comprising:
recognizing a commodity of a captured image using a first method;
emitting a voice when the commodity is recognized;
recognizing a commodity of the captured image using a second method different from the first method;
outputting, via a second generator of a second device, voice data for sounding the voice output when the commodity is recognized using the second method;
outputting, via a first generator of a first device, voice data for sounding the voice output when the commodity is recognized using the first method;
taking in, via an input of the first device, voice data output by the second generator into the first device; and
inputting voice data taken in by the input and voice data output by the first voice generator to a voice output of the first device.

13. The reading method according to claim 12, wherein the first method comprises decoding a code symbol included in an image output by an imager to obtain information.

14. The reading method according to claim 13, wherein the second method comprises obtaining feature data of an object in an image from the image output by the imager.

15. The reading method according to claim 12, wherein the output voice data when the commodity is recognized using the second method is analog data.

16. The reading method according to claim 12, wherein the output voice when the commodity is recognized using the first method is digital data.

17. The reading method according to claim 12, further comprising performing a registration process for registering information of a commodity recognized by the first recognizer or the second recognizer as sales data and a settlement process of the sales data.

18. The reading method according to claim 12, wherein in the recognizing a commodity of the captured image using a first method, the captured image is captured by an imager.

19. The reading method according to claim 18, wherein the imager includes an image sensor.

20. The reading method according to claim 19, further comprising focusing light onto the image sensor of the imager during the capture of the captured image.

* * * * *